(12) United States Patent
Pelton

(10) Patent No.: US 11,443,050 B2
(45) Date of Patent: *Sep. 13, 2022

(54) INTEGRATED BUILDING MANAGEMENT SENSOR SYSTEM

(71) Applicant: Bruce A Pelton, Laguna Niguel, CA (US)

(72) Inventor: Bruce A Pelton, Laguna Niguel, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/924,644

(22) Filed: Jul. 9, 2020

(65) Prior Publication Data

US 2020/0342124 A1    Oct. 29, 2020

Related U.S. Application Data

(63) Continuation of application No. 15/809,981, filed on Nov. 10, 2017, now Pat. No. 10,754,964, which is a
(Continued)

(51) Int. Cl.
*G06F 21/60* (2013.01)
*G06F 21/44* (2013.01)
(Continued)

(52) U.S. Cl.
CPC ......... *G06F 21/606* (2013.01); *G05B 15/02* (2013.01); *G06F 21/44* (2013.01); *G06F 21/64* (2013.01); *H04L 9/0869* (2013.01); *H04L 9/3239* (2013.01); *G05B 2219/2642* (2013.01); *H04L 9/0891* (2013.01)

(58) Field of Classification Search
CPC . G05B 15/02; G05B 2219/2642; G06F 21/44; H04L 63/101; H04L 63/126; H04L 9/0816; H04L 9/0861; H04L 9/0869; H04L 9/0891; H04L 9/3236; H04L 9/3239; H04L 2209/38

See application file for complete search history.

(56) References Cited

U.S. PATENT DOCUMENTS 9,035,917 B2    5/2015    Jansson
9,641,344 B1    5/2017    Kim
(Continued)

FOREIGN PATENT DOCUMENTS

CN    104661362 A    5/2015
DE    20309033 U1    12/2003

*Primary Examiner* — Eric W Shepperd
(74) *Attorney, Agent, or Firm* — Joseph R. DelMaster

(57) ABSTRACT

A building management system comprising an integrated sensor and control system integrated on a single application specific integrated circuit (ASIC). The ASIC combines sensor inputs necessary to monitor ambient light levels, light color, occupation/motion sensors, security sensors, temperature and humidity, barometric pressure, smoke and toxic substance sensors, and a processor to receive the sensor inputs and deliver control output signals to effect changes and make settings to each of the environmental systems that are monitored. The ASIC also provides communication and control security for the building management system, preventing hostile intrusions into the system. The storage, intelligence and processing all reside within the ASIC.

16 Claims, 15 Drawing Sheets

Related U.S. Application Data continuation-in-part of application No. 15/340,723, filed on Nov. 1, 2016, now Pat. No. 10,211,999.

(60) Provisional application No. 62/411,562, filed on Oct. 22, 2016.

(51) Int. Cl.
*G05B 15/02* (2006.01)
*G06F 21/64* (2013.01)
*H04L 9/08* (2006.01)
*H04L 9/32* (2006.01)

(56) References Cited

U.S. PATENT DOCUMENTS

| | | |
|---|---|---|
| 9,741,221 B1 | 8/2017 | Rehfeld |
| 9,920,944 B2 | 3/2018 | Chromy |
| 2009/0303467 A1 | 12/2009 | Ashdown |
| 2010/0036900 A1 | 2/2010 | Ross |
| 2010/0045971 A1 | 2/2010 | Brokopp |
| 2010/0302025 A1 | 12/2010 | Script |
| 2011/0251807 A1 | 10/2011 | Rada |
| 2012/0293334 A1 | 11/2012 | Yu |
| 2013/0019298 A1 | 1/2013 | Jover Segura |
| 2013/0106305 A1 | 5/2013 | Whitaker |
| 2013/0261809 A1 | 10/2013 | Morrow |
| 2014/0339987 A1 | 11/2014 | Burrows |
| 2014/0358294 A1 | 12/2014 | Nichols |
| 2014/0375206 A1 | 12/2014 | Holland |
| 2015/0035440 A1 | 2/2015 | Spero |
| 2015/0045962 A1 | 2/2015 | Wenzel |
| 2015/0223068 A1 | 8/2015 | Thelen |
| 2015/0356555 A1 | 12/2015 | Pennanen |
| 2016/0239723 A1 | 8/2016 | Ge |
| 2016/0269182 A1 | 9/2016 | Sriram |
| 2016/0360594 A1 | 12/2016 | Chemel |
| 2017/0031676 A1 | 2/2017 | Cechetti |
| 2017/0046652 A1 | 2/2017 | Haldenby |
| 2017/0046806 A1* | 2/2017 | Haldenby ............ G06Q 20/102 |
| 2017/0103468 A1 | 4/2017 | Orsini |
| 2017/0116693 A1 | 4/2017 | Rae |
| 2017/0132888 A1 | 5/2017 | Conlon |
| 2017/0163733 A1* | 6/2017 | Grefen .................. H04L 67/20 |
| 2017/0192400 A1 | 7/2017 | Hofschulz |
| 2017/0195130 A1 | 7/2017 | Landow |
| 2017/0295025 A1 | 10/2017 | Meriac |
| 2017/0358041 A1 | 12/2017 | Forbes, Jr. |
| 2018/0144114 A1* | 5/2018 | Fiske ..................... G06F 21/32 |
| 2018/0253702 A1* | 9/2018 | Dowding .............. H04L 9/3242 |

* cited by examiner

INTEGRATED BUILDING MANAGEMENT SENSOR SYSTEM

This application claims priority from co-pending application Ser. No. 15/340,723, filed Nov. 1, 2016, which claims its priority from three provisional applications: 62/292,970 filed Feb. 9, 2016; 62/325,978 filed Apr. 21, 2016; and 62/411,562 filed Oct. 22, 2016.

FIELD OF THE INVENTION

The invention pertains to the field of lighting and environmental control in structures (commercial, residential, hospitality, healthcare, industrial and agricultural facilities) and/or public facilities (stadiums, playing fields, parking lots, parking structures), and in particular to the integration of multiple sensors of light, daylight, temperature, pressure and humidity, occupancy, smoke/toxic substances, and other parameters into a processing unit, and controller fabricated on a single integrated circuit device capable of communicating with various networks, the cloud or the Internet of Things. The invention further pertains to control system security for sensor based building management systems.

BACKGROUND OF THE INVENTION

There are many variations of building security systems, home and office lighting systems, and various forms of environmental control systems for structures. Some of these technologies are hard-wired; some can be operated wirelessly. Some can be controlled from remote locations by commands received over networks both wireless and otherwise. Each of these control systems is either intended to be discrete as to application (e.g., lighting, security, HVAC, etc.) or may combine more than one application in a single system. However, in order to have full control capability, a user must commonly invest in more than one physical system and often more than one service provider. The present invention addresses that problem by providing a single technical solution.

When a network of sensors is dispersed throughout a building or facility, energy consuming system optimization is possible. These devices can also provide valuable intelligence about the facility's utilization, traffic flow, security and asset tracking. By providing the ability to provide this networking either through wired, optical, or wireless means an integrated system allows the designer the opportunity to make the optimal choice for a given system or facility.

While the use of sensory systems coupled to building control networks is expanding through the built environment so too is the proliferation of hacking, network invasions, and ransomware attacks. Businesses are rightfully concerned about an attacker seizing control of a building's environmental, lighting and security systems and holding them hostage for a ransom payment. If the systems are connected across multiple floors, buildings, campuses or enterprises the threat becomes even more serious.

The possibility of a ransomware attack where an entity takes over a building turning off the lights, raising the temperature to a dangerous level and locking people in or out is both conceivable and worrisome. Encryption of the devices on the building control network is a necessary security measure. Some entities are concerned that a failed, stolen or discarded device may be used to gain access to a secure network at some future point. The building security aspect of the present invention addresses this potential vulnerability.

Wireless devices generally have encryption on the link layer but that does not preclude intrusions before or after. Device security, authentication of communications and of connected devices is an ancillary issue. Providing a security method that identifies the sender and qualifies the authenticity of each packet is important.

SUMMARY OF THE INVENTION

The invention is an integrated building management system featuring an integrated building management remote system controller contained in a single ASIC. The system comprises a controller and sensor system for operation of networked lighting control, heating ventilation and air conditioning (HVAC), security monitoring, smoke and toxic gas detection, automated alerts, and command communication for all building management functions and includes a miniature multi-function sensor device that provides several sensor signals to the controller from one or more lighting fixtures. The system operates with a single application specific integrated circuit (ASIC) at its core that provides full environmental sensor capability along with a central processor that handles all of the sensor inputs, control output signals, and human interface within a secured operating environment.

The system is capable of detecting, measuring and responding in a predetermined way to occupancy, light levels, color temperature of that light, ambient temperature, driver temperature, LED array temperature, humidity, air pressure, power consumption, power rates, sonic events, various gasses and potential hazards, RFID, etc. It can communicate with other sensors, the internal network, building systems and internet based systems via wired, wireless, powerline and other technologies. Careful control of environmental systems is required not only by Department of Energy (DOE) regulations and building codes but also by prudent financial management. By determining the availability of shared spaces like conference rooms, hotel office spaces and common areas the system makes the buildings it controls more habitable.

The ASIC also carries power regulation and communication interfaces on its package. This power management component allows the chip and its sensors to operate from multiple power sources and to provide outputs that can manage many types of loads from LED drivers to VAV dampers. Its ability to measure power provides valuable additional data. Powerline communication interface enables data communications over common power line connections to and from devices similarly equipped.

The ASIC flexible interface allows users to connect with many different transceivers and communicate with their preferred protocol whether it is Infrared, RF, wired, powerline, POE, internet or cloud. Connection to one of the variously available transceivers mounted with the ASIC makes wireless communication possible with remote locations through an associated antenna (See FIG. 1, 122). Such a system offers new levels of compactness and a more complete range of sensing modalities than other current systems. This flexible interface allows the system to respond to utility generated signals, including wireless signals, and those from building management systems, RFID and detectors of gasses and other environmental factors. The ASIC device can interoperate with Zigbee, Z-Wave, WiFi, 4G LTE, Bluetooth, LIE Cat 0, and other radio protocols as well as wired protocols including powerline carrier transceivers, UARTs, POE and TCP/IP interfaces. Communication through wireless carrier or wired digital signals is therefore supported by the ASIC communication interface.

Another aspect of the invention is a miniature multi-function sensor for installation in light fixtures. A purpose-built integrated circuit has been developed that contains and shrinks the electronics required to sense temperature, humidity, occupation and motion all from within a light fixture. A single compact circuit board contains the integrated circuit, a crystal, transceiver, memory, driver output controls and necessary discrete components. The tiny circuit board is connected by two ribbon cables, one six-conductor and one three-conductor. A three-position bulkhead connector connects to a driver. The device draws power from the driver, power-over-ethernet (POE) or the supply. The integrated circuit of the miniature multi-function sensor manages the different power requirements of the various sensors, the processor, and the transceivers/comms devices.

A further aspect of the invention is the incorporation of communication and operational security measures into the ASIC device. The subject invention uses a blockchain system to prevent intrusions or seizures by unauthorized employees or outside attackers who have obtained a device that was removed from a building network or attempted other network based invasions. Alternative security methods such as CRC and checksum techniques may also be incorporated into the building control device.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim.

FIG. 3A is a circuit block diagram of the A/D converter referenced at the output of the Instrumentation Amp 224. FIG. 3B is a circuit block diagram of the Ibias generator input to the Instrumentation Amp 224. FIG. 3C is a circuit block diagram of a reference voltage (Vref) generator for the 10 bit DAC 228.

FIG. 5A depicts a passive infrared (PIR) motion sensor. FIG. 5B illustrates an infrared data receiver. FIG. 5C shows a circuit diagram of an ambient light sensor.

DETAILED DESCRIPTION

An integrated building management control and sensor system comprising all necessary computer processing for environmental sensing and control and including sensor input and control signal output functions combined on a single application specific integrated circuit (ASIC) device. The single ASIC invention provides monitoring and control of environmental systems whether it is stand-alone, networked or part of the Internet of Things (IoT). Among the things to which it can respond and exercise control are occupancy, daylight, room CCT, time, room temperature, LED array temperature, utility signals for demand response, and building management commands. The processor and data storage allow the system to continue to operate without disruption even during periods of communication or network failure.

The outputs of the ASIC can be configured to operate a wide range of LED drivers including 1-10V and 0-10V, digital addressable lighting interface (DALI), DALI+, pulse width modulation (PWM), and direct digital control (DDC). Among the sensors which can be powered by and interfaced with the ASIC are passive infrared (PIR) and digital PIR, photodetector, CMOS sensor, and smoke, fire, CO, CO2, CFC, barometric and security monitors. The smoke, carbon monoxide (CO), carbon dioxide (CO2) and chlorofluorocarbon (CFC) sensors provide accurate air quality measurement and—if necessary—can trigger alerts. An on-board programmable microprocessor, comparators and shared 10-bit ADC allows for programmable and customizable lighting scenes (that is, settings for one or more light arrays) to be loaded into an on-board FLASH memory.

Figure 1:
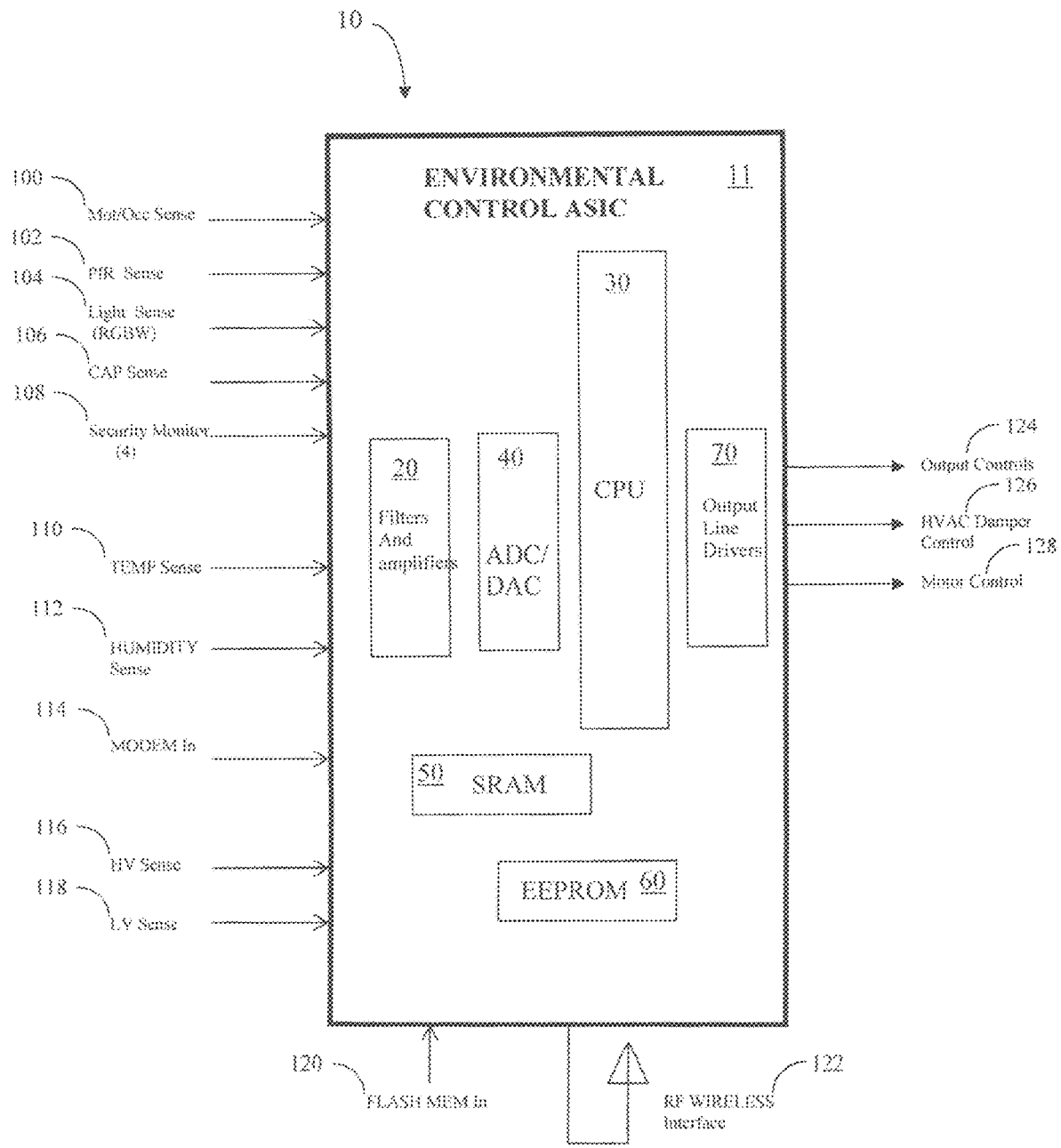
FIG. 1 is a functional block diagram of the integrated building management control and sensor system ASIC.

Referring to FIG. 1, the system 10 comprises a single ASIC 11 that integrates several fundamental functions on a single circuit device. The ASIC device 11 comprises a collection of filters and amplifiers 20 that condition the several input signals (100-120) for further processing. A group of analog-to-digital converters (ADC) and digital-to-analog converters (DAC) 40 translates sensor input signals to digital form for processing and converts digital outputs to analog where necessary for control of external devices. A computer processing unit (CPU) 30 performs all signal processing, system control decision functions, and output signal generation for the system. The ASIC also contains non-volatile areas to store unique device identification, private key and other security functions.

Supporting the processor 30 are a static read-only memory (SRAM) 50 and an electrically erasable programmable read-only memory (EEPROM) 60. The SRAM 50 provides data storage capacity for the processor 30 while the EEPROM 60 enables updates to the operating program and/or subroutines that operate the processor 30. The ASIC 11 also comprises a set of output line drivers for control signals generated by the processor 30 that are intended for operation of external systems such as lighting and HVAC systems.

The ASIC flexible interface allows users to connect with many different transceivers and communicate with their preferred protocol whether it is Infrared, RF, wired, powerline, POE, internet or cloud. Connection to one of the variously available transceivers mounted with the ASIC makes wireless communication possible with remote locations through an associated antenna (See FIG. 1, 122). Such a system offers new levels of compactness and a more complete range of sensing modalities than other current systems. This flexible interface allows the system to respond to utility generated signals, including wireless signals, and those from building management systems, RFID and detectors of gasses and other environmental factors. The ASIC device can interoperate with Zigbee, Z-Wave, WiFi, 4G LTE, Bluetooth, LTE Cat 0, and other radio protocols as well as wired protocols including powerline carrier transceivers, UARTs, POE and TCP/IP interfaces. Communication through wireless carrier or wired digital signals is therefore supported by the ASIC communication interface.

In order that the system be capable of processing and controlling several environmental functions, the ASIC 11 has a number of sensor inputs for the processor to be aware of the various conditions (e.g., lighting, temperature and humidity, air pressure, security monitors) existing in its facility (or facilities). FIG. 1 illustrates several such sensor inputs. A motion/occupancy sensor generates a signal 100 indicating the presence of a person or persons in a monitored space. A passive infrared sensor (PIR) 102 input receives a signal indicating detection of one or more heat sources in a monitored space. A PIR or a thermopile is used to determine occupancy. They do so by monitoring heat sources. They may have multiple pixels allowing the counting of people.

The system may include another infrared data sensor (not shown) for reception of remote control signals or commissioning commands from a remote device. Light sensors provide one or more inputs 104 (e.g., red, green, blue, white light levels) for colorimetry calculations and determination of light conditions (that is, light temperature in degrees Kelvin) in monitored areas for control by the processor 30.

A capacitance sensor 106 is provided for alternate measurement of humidity. A number of sensor inputs are provided for security monitor 108 inputs, receiving signals from window and door sensors, for example. Sensor inputs for temperature 110 and humidity 112 condition monitors in one or more locations allow control of environmental conditions in monitored spaces. For example, the processor determines the optimal start time for HVAC systems based on sensed parameters comprising exterior ambient temperature, humidity, interior temperatures, interior humidity. Temperature sensing also enables the processor to make corrections for sensor variations caused by temperature changes.

The combination of temperature and light sensor signals enables the processor to make control determinations for related systems. In spaces equipped with electrically operated window shades (or LCD darkening technology) for example, the processor determines the optimal mix of daylight and electric space lighting and operates window shading accordingly if heat gain offsets lighting reduction gains in a monitored space.

A MODEM input 114 facilitates data input over communication lines. Input voltage level sensors monitor for high 116 and low 118 voltage conditions on the power supply line. A FLASH memory input 120 provides an interface through which to load desired control parameters into the ASIC processor 30 and/or load new program updates into the EEPROM 60. An RF wireless interface 122 and antenna enables wireless control input and output signaling to and from the device 10. Computed building status based on the full scope of sensor data is communicated to building systems with the RF transceiver and interface.

The result of processing one or more sensor inputs is the creation and output of signals for control of the associated environmental system. For instance, sensing the temperature and humidity of a space provides the data necessary to compare the sensed value to a programmed value in the processor. If that comparison indicates that an adjustment of one or both measured parameters is necessary, then appropriate output signals are generated by the processor 30. These signals are conditioned by the output line drivers 70 to operate the physical system, in this case the HVAC. Driver lines are provided to the HVAC damper 126, the air circulating motor 128, and other outputs 124 necessary to control the heating and/or air conditioning units. The ASIC processor manages variable air volume in an HVAC system to adjust environmental characteristics in a monitored and controlled space. In a similar manner, output signals (not shown) are generated for the security system and lighting controls based on inputs from the motion/occupation sensors 100, security monitor 108, and light level sensors 104.

Figure 2:
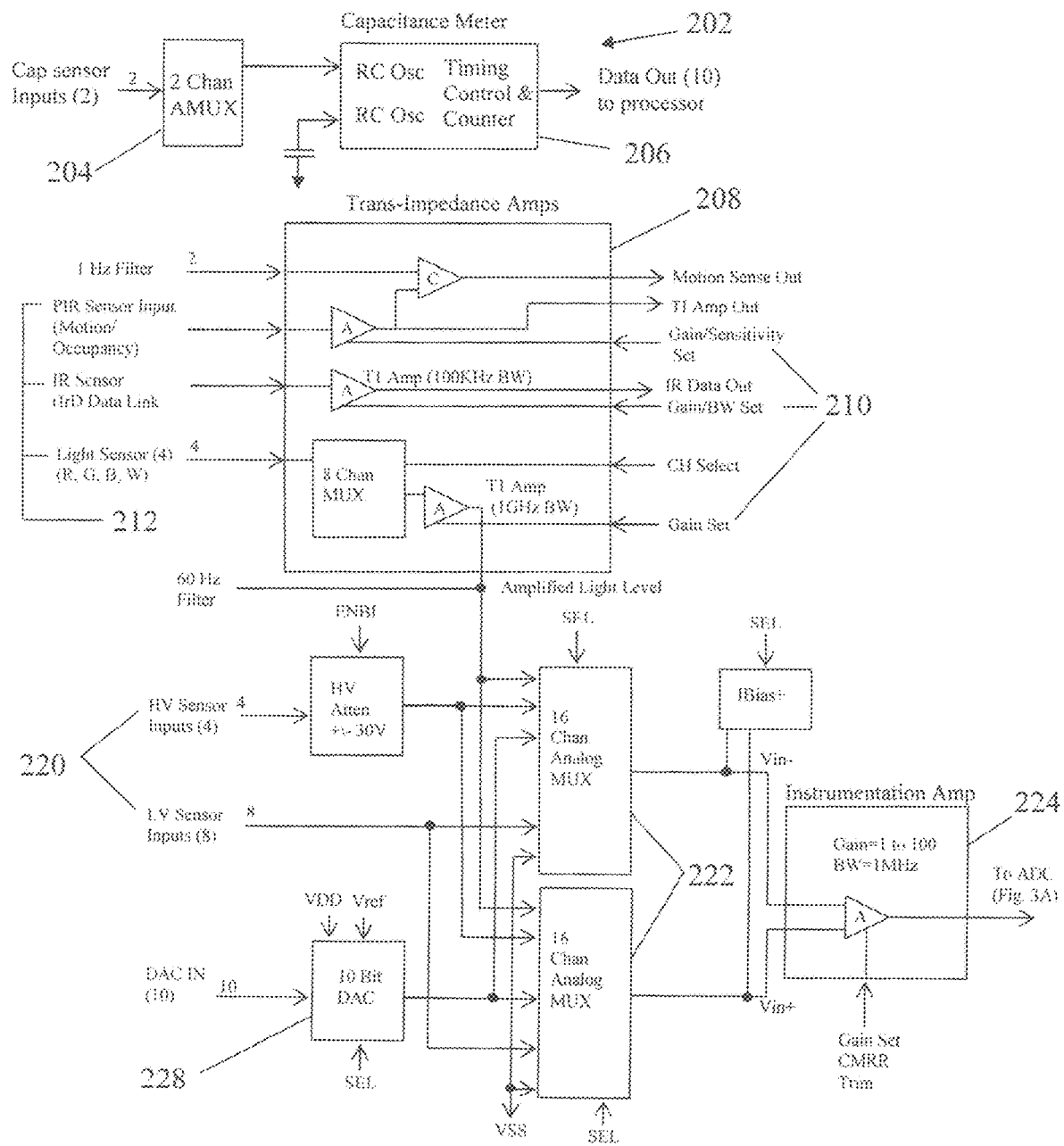
FIG. 2 is a partial circuit block diagram of the invention.

Referring to FIG. 2, there are provided illustrations of the sensor circuits in block diagram form from which persons skilled in the art may construct the actual electronic circuits. The temperature and humidity sensors are capacitance devices that create the two inputs to the capacitance meter 202 through a two-channel analog multiplexer (AMUX) 204. The varying capacitances become inputs to an RC oscillator capacitance meter 206, the output of which is counted and becomes 10-line data output to the microprocessor. This feature enables the onboard processor to perform integrated temperature and humidity detection, measurement and determination.

Another input stage illustrated in FIG. 2 is that which processes the motion/occupancy, infrared data signal, and light level sensors 212 through trans-impedance amplifiers 208 for producing stable outputs to the processor. An infrared data signal receiver receives infrared data communications for programming, inter-sensor data sharing and commissioning. Each of the trans-impedance amplifiers has the sensor signal as input and produces an output based on that input and a gain (or gain/bandwidth) setting 210 received from the processor.

An RFID bridge may be connected to the I/O of the chip and powered by the power management section of the chip. The RFID bridge can energize and read data from RFID tags and people, equipment, drugs and merchandize.

The system is also capable of reading low power beacons attached to portable equipment in facilities such as hospitals and schools.

Figure 3A:
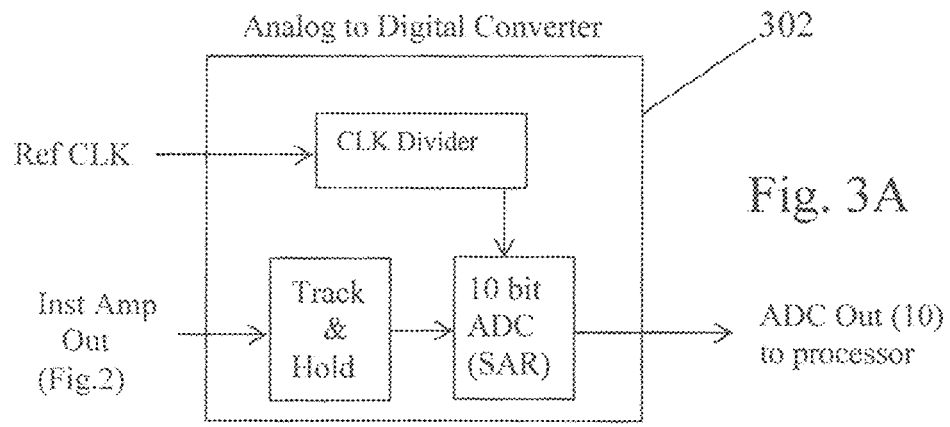
FIGS. 3A, 3B and 3C are partial circuit block diagrams of parts of the invention continued from FIG. 2.

There is a sensor circuit for sampling both high and low voltage supply levels 220 by the ASIC device. These supply voltages are directed through analog multiplexers 222, filtered by an instrumentation amplifier 224 and sent on to an analog-to-digital converter 302 (see FIG. 3A) for sampling and input to the processor. Sensing current, voltage and phase angle of a power supply (such as a lighting system or an HVAC system) enables the processor on the ASIC to determine the power consumption of the monitored system and make necessary adjustments for economy.

Figure 3B:
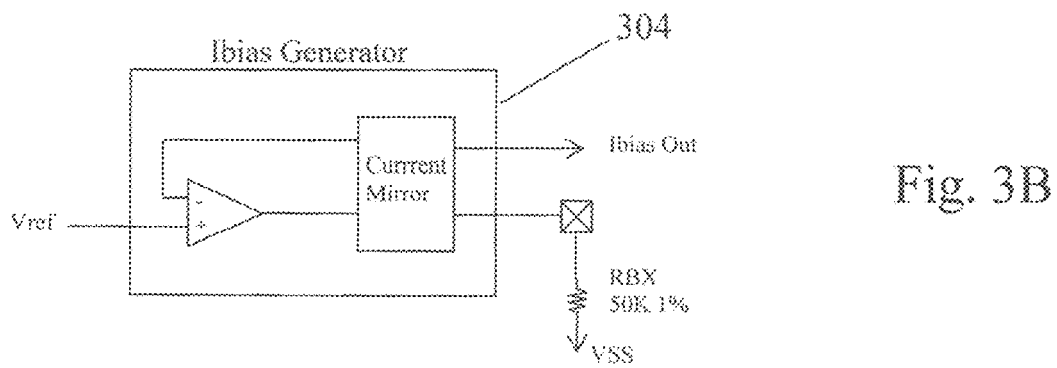
Figure 3C:
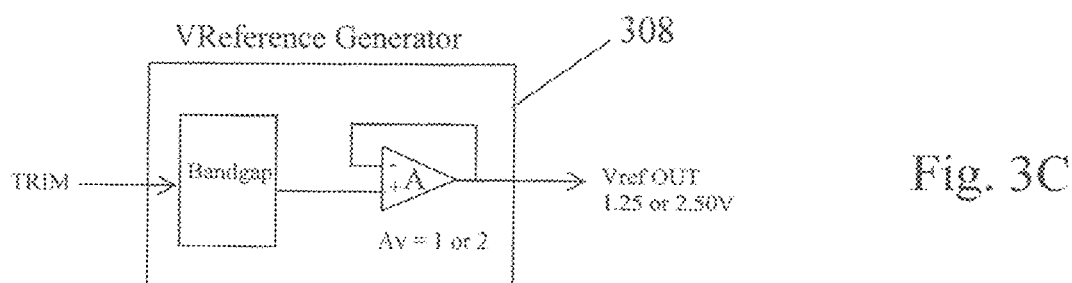

Referring to FIG. 3B, also illustrated is the Ibias generator that creates the Ibias level that is input to the instrumentation amplifier 224 in the voltage level sensor circuit of FIG. 2. A voltage reference generator 308 is illustrated in FIG. 3C that produces the reference voltage that is supplied to the 10-bit DAC 228 in FIG. 2.

Figure 4:
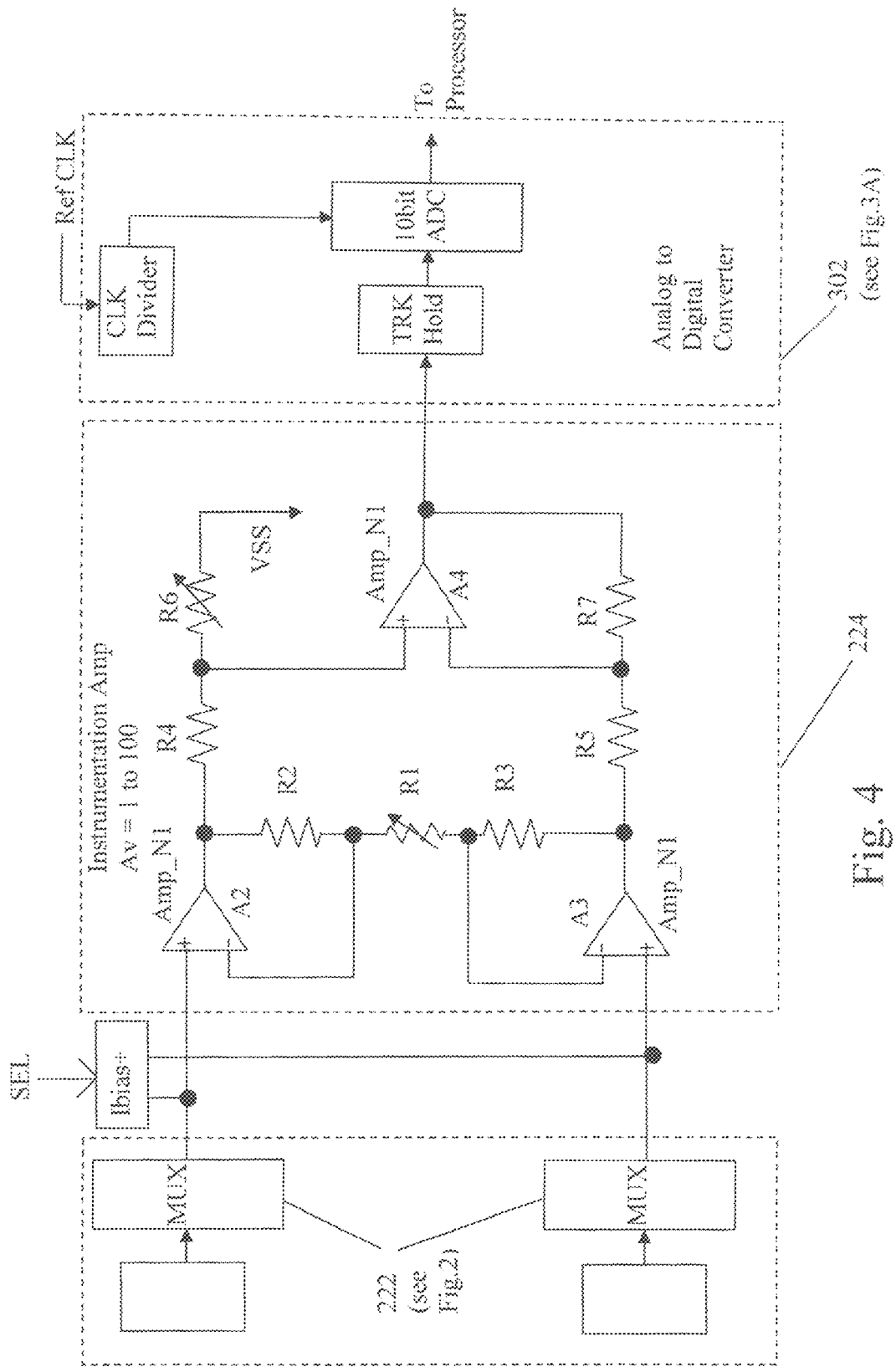
FIG. 4 is a partial circuit block diagram showing the light level detection part of the invention illustrated in FIG. 2 with an embedded circuit diagram of the Instrumentation Amplifier shown in FIG. 2.

Reference to FIG. 4 shows a more detailed circuit diagram of the Instrumentation Amplifier 224 shown in FIG. 2 in the voltage sensor stage of the ASIC. The gain of the amplifier is adjustable from 1 to about 100 by varying R1 as necessary to adjust the sensitivity of the circuit and for accuracy of measurement of the high and low voltages.

Figure 5A:
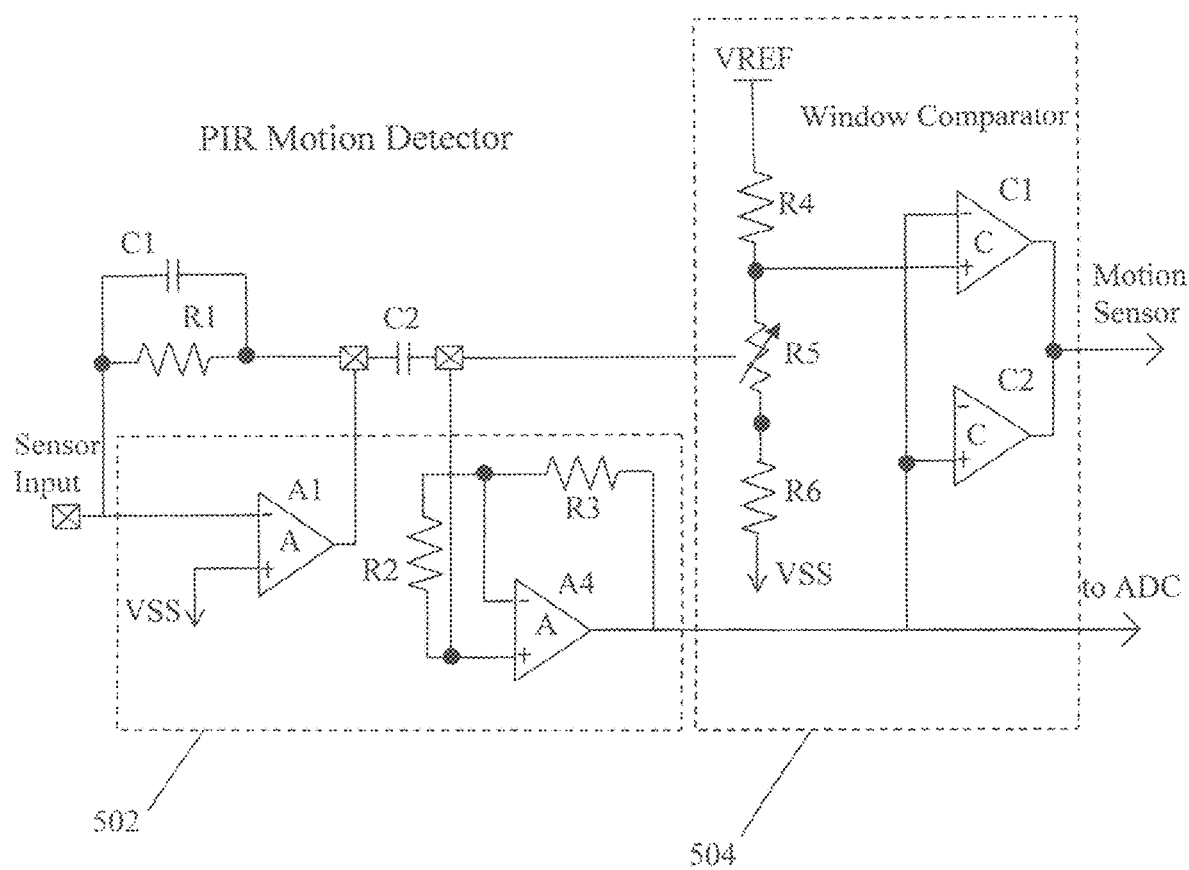
FIGS. 5A, 5B, and 5C are circuit diagrams of three detection circuits forming three of the inputs to the processing function of the invention.
Figure 5B:
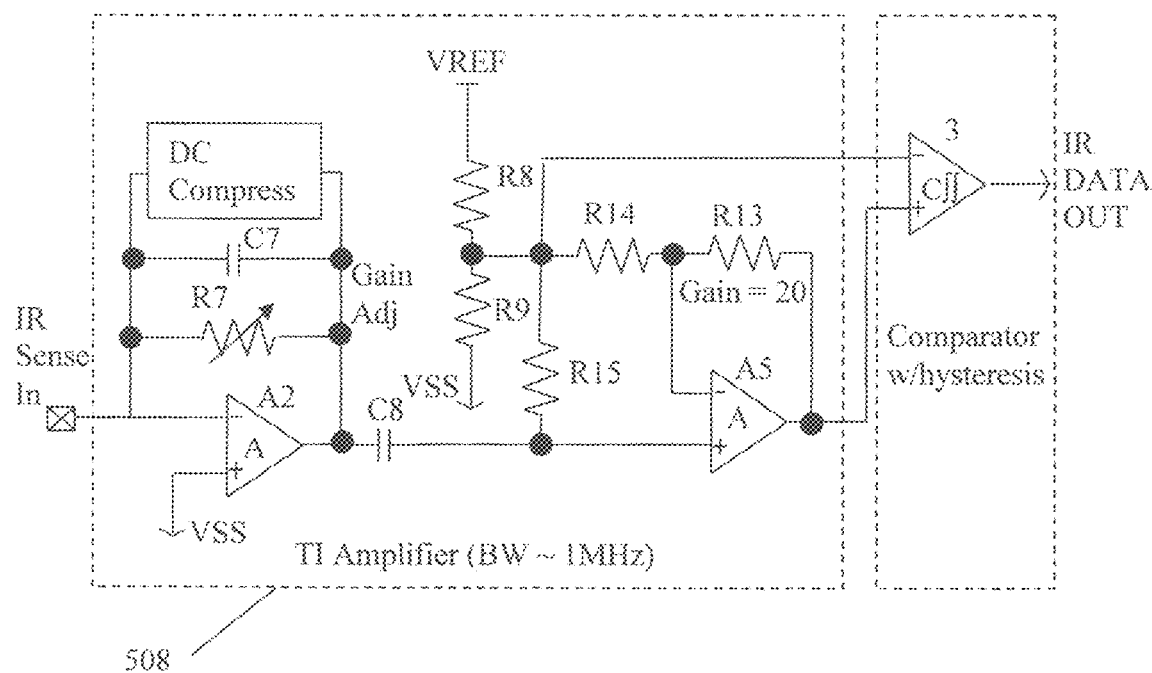
Figure 5C:
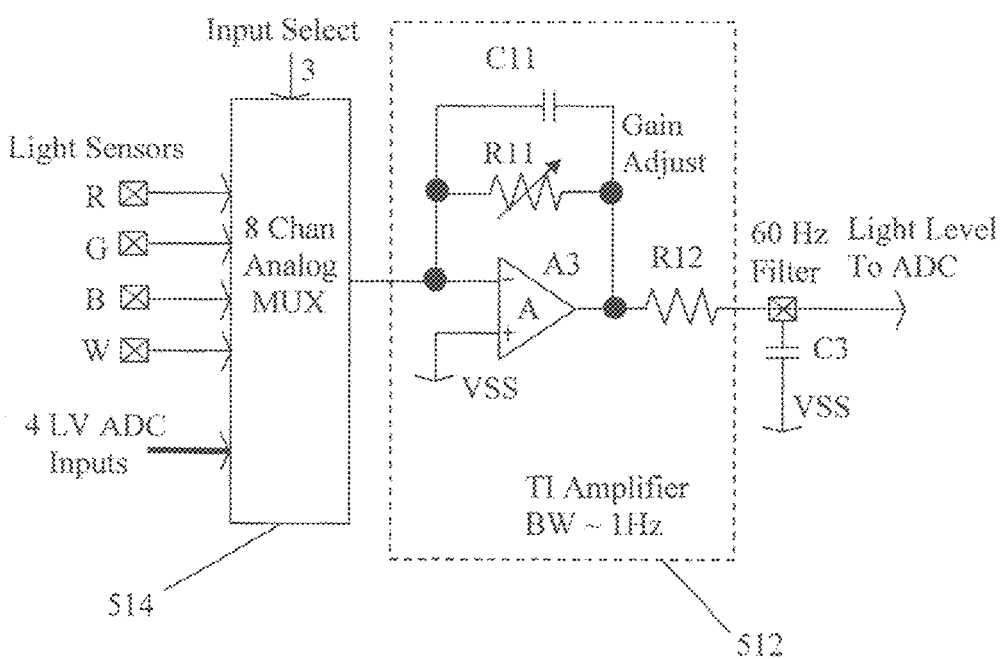

FIG. 2 illustrated that the motion sensors, infrared data link sensor, and the light level sensors passed their inputs through trans-impedance (TI) amplifiers 208 for conditioning before processing. Reference to FIGS. 5A, 5B and 5C shows the configuration of each of these TI amplifiers. Each configuration is different per the function of the sensor. The passive infrared motion sensor and occupancy indicator circuit is conditioned by a two-stage amplifier 502 shown in FIG. 5A that smoothes the input for the window comparator 504 and amplifies it for quantification by an analog-to-digital conversion. The infrared data receiver shown in FIG. 5B employs a TI amplifier 508 with a band-limiting filter stage and a gain stage for processing data pulses in an optical infrared signal. The ambient light sensor shown in FIG. 5C places a TI low-pass filter amplifier 512 at the output of the multiplexer 514 that handles the four light color inputs from the sensor. This amplifier 512 has a very low bandwidth to smooth the selected color sensor output to the ADC.

The processor on the device uses motion and occupancy sensor information to provide unique security functions in the system. Based upon occupancy and motion sensor detections signals, the processor determines intruder location, movement, and path projection, including likely egress determination, to assist security personnel in making apprehension of said intruder. An included security function determines a count of likely intruders based on occupancy sensor detection patterns. The ASIC security capability is augmented by audio detection circuits for occupancy detection and, importantly, for event detection even in the absence of human presence.

It is important to provide for the security of the system in order that outside actors are not able to gain unauthorized access. Any system using wireless communication is vulnerable to intrusion. Therefore the system is configured for encrypted communication using public and/or private key modalities familiar to those skilled in the art of data encryption and protection. Another implementation for system security may be a blockchain database storing private encryption key data for access only by authorized parties.

By resetting the blockchain at random intervals it can be shortened significantly. A CRC can be generated of the past transactions and stored within the blockchain effectively creating a past and present private key. This may be coupled with a MAC address header for each packet that is transmitted with each transaction. After being checked against a library of accepted MAC addresses the verified packet would be accepted and acted upon. The blockchain is reset at random, irregular intervals. It includes CRC of past transactions. This makes it a living, constantly changing key with authentication. Any foreign device entering the network will not have the current key. Its transmissions will not be accepted. A record is kept of all transactions and transmitted to all units in network as part of each command. The register is reseeded at random intervals to keep packet size down. Any unit removed from the system and later attempting to reenter without being formally commissioned would not have the appropriate key and would not be in the MAC address database. Commissioning would include seeding the blockchain storage and registering the MAC address into the accepted device database.

Figure 6:
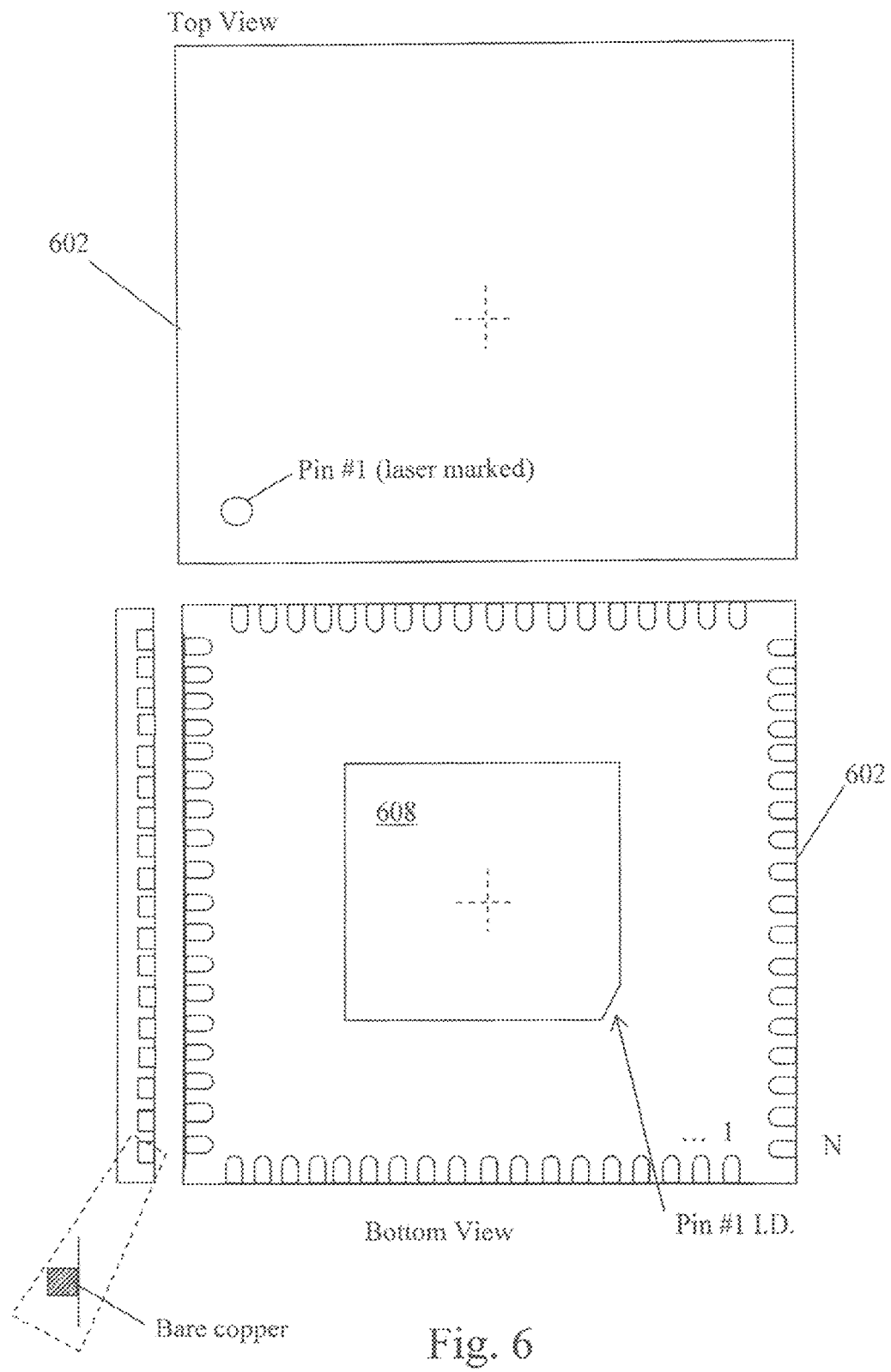
FIG. 6 is a top and bottom plan diagram of the integrated circuit device of the invention.

Referring to FIG. 6 there is shown a plan diagram (top and bottom) of the integrated circuit ASIC of the present invention. It comprises a 72-pin substrate 602 carrying the ASIC wafer 608 on which all of the circuits reside. Each of the 18 pins on each side of the substrate is a solid copper deposit connected to the corresponding electrode on the wafer by a filament wire in the substrate. Fabrication is by conventional means known to those skilled in the art of integrated circuit manufacture.

Table 1A is a list of the electrical characteristics of the ASIC of the present invention. It details the electrical norms for the reference voltage generators and regulator circuits of the device along with the various photo sensor elements.

TABLE 1A

Electrical Characteristics
$V_{VV}$ = 3.3 V, Temperature = 25° C. (External components are designated with an "X" subscript.)

| Parameter/Circuit | Symbol | Conditions | Min | Typical | Max | Units |
|---|---|---|---|---|---|---|
| Reference Generators & Regulators | | | | | | |
| Bandgap Voltage Reference Output Voltage | $V_{REF}$ | $R_L > 10$ KΩ $C_L < 100$ pF | | 2.2 | | V |
| Bandgap Voltage Reference Trim Range | $VREF_{TR}$ | Resolution | | 23 | | mV |
| | | Setting = Minimum | | −7.3 | | % |
| | | Setting = Maximum | | +6.6 | | % |
| Bias Current Reference $R_{BIAS}$ Current | $I_{BIAS}$ | $R_{BIASX}$ = 121 KΩ, 1% $C_{BIAS} > 20$ pF (PCB stray C) $V_{REF} = 2.50$ V | | 10 | | uA |
| LDO Voltage Regulator Output Voltage | $VREG_{LDO}$ | $V_{REF}$ = 2.50 V, $C_{LX} \geq 1$ uF SEL1, SEL0 = 00 | | 1.80 | | V |
| | | SEL1, SEL0 = 01 | | 2.50 | | V |
| | | SEL1, SEL0 = 10 | | 3.00 | | V |
| | | SEL1, SEL0 = 11 | | 3.60 | | V |
| LDO Voltage Regulator Maximum Output Current | $IREG_{LDO}$ | $V_{POS}$ = 5.0 V | | 100 | | mA |
| Boost Voltage Regulator Output Voltage | $VREG_{BOOST}$ | $V_{POS}$ = 5.0 V, $V_{REF}$ = 2.50 V 3 Stage, $C_{BSTX}$ = 1 uF | | 15.0 | | V |
| Boost Voltage Regulator Maximum Output Current | $IREG_{BOOST}$ | $V_{POS}$ = 5.0 V 3 Stage, $C_{BSTX}$ = 1 uF | | 100 | | mA |
| Buck Voltage Regulator Output Voltage | $VREG_{BUCK}$ | $V_{POS}$ = 15.0 V $V_{REF}$ = 2.50 V | | 5.0 | | V |

TABLE 1A-continued

Electrical Characteristics
$V_{VV}$ = 3.3 V, Temperature = 25° C. (External components are designated with an "X" subscript.)

| Parameter/Circuit | Symbol | Conditions | Min | Typical | Max | Units |
|---|---|---|---|---|---|---|
| Photo Sensors (PIR Motion Detector, Ambient Light Level/Color, IR Data) | | | | | | |
| PIR Motion Sensor Gain | $PIR_{MSG}$ | $R_{FX}$ = 20 KΩ (external) | | 400 | | mV/uA |
| | | $R_{FX}$ = 100 KΩ (external) | | 2,000 | | mV/uA |
| | | $R_{FX}$ = 500 KΩ (external) | | 10,000 | | mV/uA |
| PIR Motion Sensor Bandwidth | | ($R_{FX}$, $C_{FX}$ are external) | | | | |
| Low pass $F_c$ (−3 dB) | $PIR_{BWL}$ | $R_{FX}$ = 100 KΩ, $C_{FX}$ = 1 uF | | 0.5 | | Hz |
| High pass $F_c$ (−3 dB) | $PIR_{BWH}$ | $C_{CX}$ = 1uF | | 5 | | Hz |
| PIR Motion Detector | $PIR_{TRIP}$ | SEL1, SEL0 = 00 | | ±85 | | mV |
| Trip Levels | | SEL1, SEL0 = 10 | | ±170 | | mV |
| | | SEL1, SEL0 = 10 | | ±340 | | mV |
| | | SEL1, SEL0 = 11 | | ±675 | | mV |
| IRD Sensor Gain | $IRD_G$ | | | 800 | | mV/uA |
| IRD Detector Bandwidth | $IRD_{BW}$ | | | 25 to 500 | | KHz |
| IRD Detector Rejection Ratio | $IRD_{RR}$ | Frequency = 60 Hz | | −70 | | dB |
| IRD Detector Hysteresis | $IRD_{HYS}$ | | | ±40 | | mV |
| Ambient Light Sensor | $AMBL_G$ | SEL1, SEL0 = 00 | | 10 | | mV/uA |
| Gain Settings | | SEL1, SEL0 = 01 | | 30 | | mV/uA |
| | | SEL1, SEL0 = 10 | | 100 | | mV/uA |
| | | SEL1, SEL0 = 11 | | 300 | | mV/uA |
| Ambient Light Sensor Bandwidth | $AMBL_{BW}$ | $C_{FX}$ = 10 uF (external) | | 0.32 | | Hz |
| Amb. Light Sensor Rejection Ratio | $AMBL_{BW}$ | $C_{FX}$ = 10 uF, Frequency = 60 Hz | | −40 | | dB |

Table 1B provides a list of the electrical parameters associated with the capacitance sensor, the analog-to-digital converter and instrumentation amplifiers, and the DALI and digital interface circuits.

TABLE 1B

Electrical Characteristics (continued)
$V_{DD}$ = 3.3 V, Temperature = 25° C. (External components are designated with an "X" subscript.)

| Parameter/Circuit | Symbol | Conditions | Min | Typical | Max | Units |
|---|---|---|---|---|---|---|
| Capacitance Sensor (Relative Humidity) | | | | | | |
| Capacitance Meter Test Frequency | $CAPM_F$ | $C_{RHIX}$ = 80 pF | | 15 | | KHz |
| Capacitance Meter | $CAPM_{CNTL}$ | RHI = 0% ($C_{RHIX}$ = 80 pF) | | 512 | | clocks |
| Counter Output at Low Resolution | | RHI = 100% ($C_{RHIX}$ = 107 pF) | | 381 | | clocks |
| Capacitance Meter | $CAPM_{CNTH}$ | RHI = 0% ($C_{RHIX}$ = 80 pF) | | 2048 | | clocks |
| Counter Output at High Resolution | | RHI = 100% ($C_{RHIX}$ = 107 pF) | | 1526 | | clocks |
| Capacitance Meter Resolution | $CAPM_{RES}$ | Resolution = Low | | 0.8 | | % RHI |
| | | Resolution = High | | 0.2 | | % RHI |
| Capacitance Meter Cycle Time | $CAPM_{CT}$ | Resolution = Low | | 35 | | msec |
| | | Resolution = High | | 130 | | msec |
| ADC & Instrumentation Amplifier | | | | | | |
| High Voltage Input Attenuation | $HVIN_{ATN}$ | | | X0.1 | | |
| High Voltage Input Range | $HVIN_{RGN}$ | Pull-up enabled | | −30 to $V_{DD}$ | | V |
| | | Pull-down enabled | | 0 to +30 | | V |
| Input DAC Resolution | $IDAC_{RES}$ | | | 8 | | bits |
| Input DAC Output Range | $IDAC_{RES}$ | $V_{TOP}$ = $V_{DD}$ | | 0-$V_{DD}$ | | V |
| | | $V_{TOP}$ = $V_{REF}$ (+2.50 V) | | 0-2.50 | | V |
| Input DAC Output Linearity Error | $IDAC_{LIN}$ | Guaranteed monotonic | | <1 | | bit |
| Instrumentation Amp Gain | $IA_{AV}$ | SEL1, SEL0 = 00 | | 2.0 | | V/V |
| | | SEL1, SEL0 = 01 | | 8.0 | | V/V |
| | | SEL1, SEL0 = 10 | | 25.0 | | V/V |
| | | SEL1, SEL0 = 11 | | 100 | | V/V |
| Instrumentation Amp CMRR | $IA_{CMRR}$ | $V_{IN}$ = 1.25 V | | −40 | | dB |
| ADC Track & Hold Acquisition time | $ADC_{ACQ}$ | $V_{IN}$ step = 1.25 V | | 1 | | usec |
| ADC Track & Hold Droop | $ADC_{DRP}$ | $V_{HOLD}$ step = 1.25 V | | <1 | | mV/msec |
| ADC Resolution | $ADC_{RES}$ | $V_{REF}$ = 2.50 V | | 10 | | bits |
| | | | | 2.44 | | mV/bit |
| ADC Conversion Time | $ADC_{CONV}$ | ADC Clock Freq = 1 MHz | | 10 | | usec |
| ADC Conversion Accuracy | $ADC_{DLE}$ | $V_{IN}$ = 0.0 V to 2.50 V | | <1 | | bit |
| Differential Linearity Error | | Guaranteed monotonic | | | | |
| DALI & Digital Interface Circuits | | | | | | |
| DALI Output control-Digital PWM Resolution | $DALI_{PWM}$ | Output data = 0 to 255 | | 8 | | bits |

TABLE 1B-continued

Electrical Characteristics (continued)
$V_{DD}$ = 3.3 V, Temperature = 25° C. (External components are designated with an "X" subscript.)

| Parameter/Circuit | Symbol | Conditions | Min | Typical | Max | Units |
|---|---|---|---|---|---|---|
| DALI Output Control-Analog DAC Resolution | $DALI_{DAC}$ | Output data = 0 to 255 | | 8 | | bits |
| | | Output range #1 | | 0 to 10 | | V |
| | | Output range #2 | | 1 to 10 | | V |
| Digital Interface-SPI Maximum clock frequency | $SPI_{CF}$ | | | 10 | | MHz |
| Digital Interface-I²C Maximum clock frequency | $I2C_{CF}$ | | | 10 | | MHz |
| Digital Interface-UART Maximum clock frequency | $UART_{CF}$ | | | 5 | | MHz |

Finally, TABLE 2 lists the pin configuration of the sensor system ASIC device. Several of the pins on the ASIC are programmable as input or output as necessary (e.g., SPI, GPIO).

TABLE 2

Pin Configuration

| # of Pins | Pin Name | Pin Type | Description |
|---|---|---|---|
| 1 | VDC_EXT | Power | External supply |
| 1 | VDC_POE | Power | Power over Ethernet |
| 1 | VDALI | Power | DALI Power & Data |
| 1 | VSUPPLY | Power | DALI power filter capacitor |
| 1 | VDD | Power | Digital power |
| 2 | VSS | Ground | System ground |
| 1 | VDD_BUCK | Regulator | Buck VDD output |
| 1 | BUCK_IND | Regulator | Buck regulator inductor |
| 4 | VREG1-4 | Regulators | Linear (LDO) regulator outputs (4) |
| 1 | VPOS_BOOST | Regulator | Boost regulator output |
| 1 | BOOST_CLK | Regulator | Charge pump clock (phase 1) |
| 1 | BOOST_CLKN | Regulator | Charge pump clock (phase 2) |
| 1 | RESET | Digital Input | External Reset/POR bypass |
| 2 | XTAL1 | Xtal Oscillator | Crystal oscillator #1 (In & out) |
| 2 | XTAL2 | Xtal Oscillator | Crystal oscillator #2 (In & out) |
| 1 | CLK_OUT | Clock Output | Reference clock output |
| 1 | CLK_SEL | Digital Input | Clock select (XTAL1 or TEST-CLK) |
| 4 | SPI | Digital I/O | SPI interface pins (CS, Clock, Data In, Data Out) |
| 2 | I²C | Digital I/O | I²C interface pins (Clock & Data I/O) |
| 2 | UART | Digital I/O | Universal Transmit & Receive |
| 8 | uC GPIO | Digital I/O | 8 General Purpose Digital I/O |
| 5 | uC GPIO | Digital I/O | 5 Digital I/O for external Flash |
| 1 | DALI_PWM | HV Digital Out | DALI PWM control signal |
| 1 | RBIAS | Analog | External RBIAS resistor |
| 1 | VREF | Analog | +2.5 V Reference Voltage Output |
| 2 | PIR 1 Hz Filter | Analog | External RC for Motion sensor filter |
| 1 | IRD 60 Hz Filter | Analog | External C for Ambient light sensor filter |
| 6 | Photo Sensors | Analog | IR Sensors (Motion sensor, IRD & Ambient light) |
| 2 | RHI Sensors | Analog | Relative humidity sensors |
| 12 | V Sensors | Analog | General purpose voltage sensors (to ADC) |
| 1 | A_TEST | Analog | Analog test port |
| 1 | DALI_DAC | Analog | DALI Analog control voltage (0-10 V |

Another aspect of the invention is a miniature multi-function sensor for installation in light fixtures. A purpose-built integrated circuit has been developed that contains and shrinks the electronics required to sense temperature, humidity, barometric pressure, occupation and motion all from within a light fixture. Existing sensors are so large that they disrupt the integrity of the fixture and building design. Existing sensors attempt to estimate the temperature of the space by measuring the core temperature of the microprocessor inside the sensor that is itself inside a fixture and applying an adjustment factor. Such sensors also use multiple off-the-shelf components to create assemblies that can monitor the building and its occupants. The use of components like these increase the cost, complexity, assembly difficulty, size and cost of existing systems while making them less robust.

Figure 7:
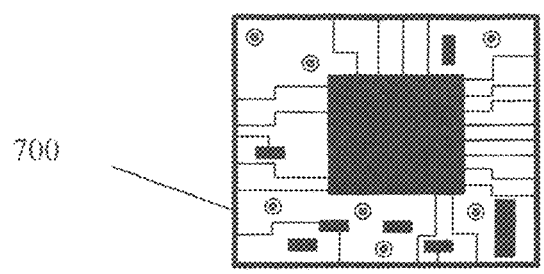
FIG. 7 is a plan view representation of the miniature circuit hoard of the light fixture sensor device.

Instead, in this aspect of the present invention, the electronics associated with the miniature multi-function sensor may be contained within the light fixture. As shown in FIG. 7, a single compact circuit board contains the integrated circuit 700 a crystal, transceiver, memory, driver output controls and necessary discrete components. The tiny circuit board is connected by two ribbon cables, one six-conductor and one three-conductor. A three-position bulkhead connector connects to a driver. (See FIG. 9) The device draws power from the driver, power-over-ethernet (POE) or the supply. The ASIC manages the different power requirements of the various sensors, the processor, and the transceivers/comms devices. The combined device is less than one square inch in size.

Figure 8:
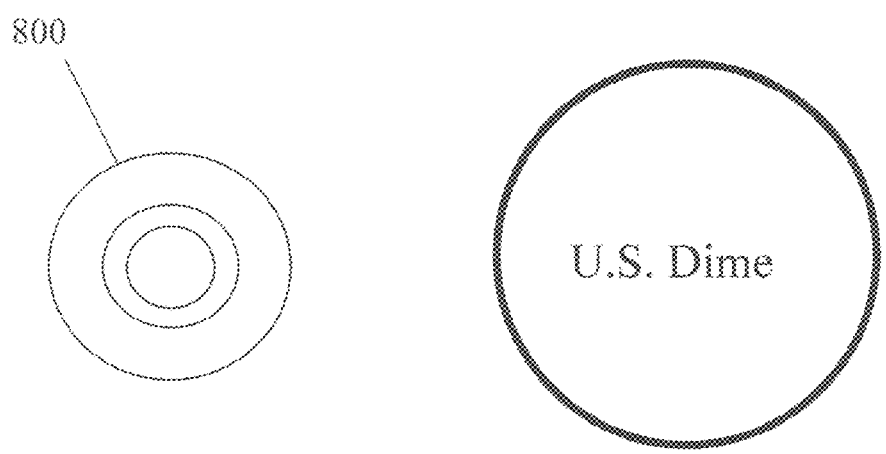
FIG. 8 is an actual size top plan view of the miniature light fixture sensor device compared to a proportional representation of a U.S. dime.
Figure 9A:
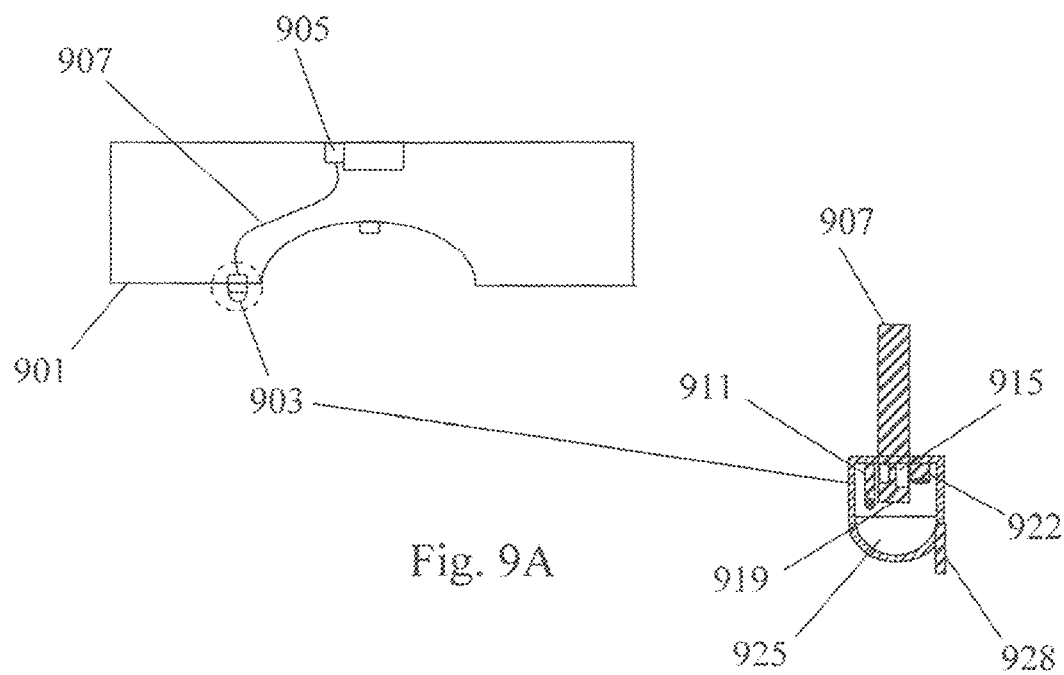
FIG. 9A is a schematic view of the miniature light fixture sensor device.
Figure 9B:
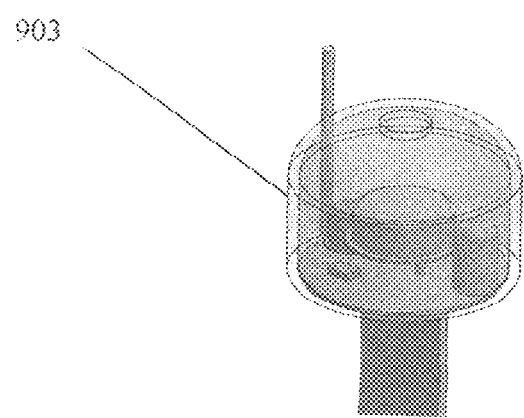
FIG. 9B is a three-dimensional grayscale drawing of the light fixture sensor device.

Referring to FIG. 8, the multi-sensor array 800 is a tiny button, smaller than a U.S. dime. This device contains a thermopile, thermistor, humidity sensor, barometer, photosensor, optical sensor, infrared sensor, a status LED and an antenna that transmits the sensor outputs. FIG. 9A illustrates the placement of the multi-sensor device 903 in a light fixture 901. The multi-sensor 903 is attached by a ribbon cable 907 to a remote bulkhead connector 905 that connects to a driver in the fixture. The ribbon cable 907 connects into the underside of the multi-sensor device and into the circuit board 700. As shown in FIG. 9A, the multi-sensor device may contain a miniature IR sensor 911, a humistat 915, barometer (not shown), a thermopile 919, a photosensor 922, an optical sensor 925 and an RF antenna 928. The illustration in FIG. 9B shows the internal configuration of the sensor elements in three dimensions.

Multicellular thermopile sensors or CMOS sensors can be used to create an image of a few pixels that may converted and processed in the CPU of the ASIC to enable people counting in the space monitored by the multi-sensor device.

The system may include dual thermopile sensors to monitor $CO_2$ levels. One may be equipped with a narrow bandpass filter allowing only narrow portions of the infrared spectrum while the other admits a broader IR spectrum. The ASIC may then take in and process the analog signals from the sensors and measure the relative concentration of returns from the portion of the spectrum reflected by $CO_2$.

Security Measures

The subject invention uses a blockchain system, or other security codekey technology, to prevent intrusions or seizures by unauthorized employees or outside attackers who have obtained a device that was removed from a building network or attempted other network based invasions. That technology is physically embodied with the ASIC and enables validation of commands it executes and data it transmits.

Wireless devices generally have encryption on the link layer but that does not preclude intrusions before or after. Device security, authentication of communications and of connected devices is an ancillary issue. Providing a security method that identifies the sender and qualifies the authenticity of each packet is important.

Communication and operational security are provided on board the control ASIC device. Blockchain security methodology operates by constructing a ledger of all transactions within each transaction as a validation key. The subject invention sends a ledger of select interactions from sensors and systems on the building network. Before the system will respond to commands or data from any device on the network the issuing device will have to verify that it is in possession of the current ledger of transactions.

This data may include temperature, humidity, light levels, occupancy, fixture power consumption and multiple other parameters. With a building management system with thousands of sensors and hundreds of daily operations the size of this ledger becomes problematic especially when it must be transmitted over low bandwidth connections. This can be facilitated by resetting the blockchain at random intervals shortening it significantly. Alternately the transaction logs of certain randomly selected units could be used to generate a key.

In lieu of the blockchain a CRC can be generated of the past transactions and stored within the blockchain effectively creating a past and present private key. This may be coupled with a MAC address header for each packet that is transmitted with each transaction. After being checked against a library of accepted MAC addresses the verified packet is be accepted and acted upon. Alternatively, a count of all transactions rather than a ledger may be the seed for establishment of a new key. The count of all transactions may also be combined with ledger data to establish a new key.

Whichever method or combination or combination thereof is used to generate the key, every device on the network is reseeded with it at regular intervals. Any device that has left the network for any reason will not be permitted to receive the new ledger or key. It will be frozen out until such time that it is recommissioned by the system administrator and the current key is replaced in the ASIC's key storage system.

The subject system may also be directly Cloud connected. The blockchain processing, checksum or CRC checking routine is also drawn from the ASIC and employed in those transactions. In the remainder of the following description, the general references to blockchain shall also include other private key methodologies that may be employed on the ASIC.

When upgrades to the system firmware or software are submitted to the device for installation the blockchain processing, checksum or CRC checking routine will also be employed in those transactions before acceptance and installation of the new or revised code. Any request to access or alter system memory will be subject to the blockchain processing, checksum or CRC checking routine.

The security aspect of the invention resides in the ASIC security area where it interacts with the system software for the various network-connected sensors and the controls which respond to them. Each transaction generates data to produce a new key. The blockchain, CRC, random blockchain or reset blockchain are transmitted on a regular basis to all sensors in an exchange validated by receipt of the prior key.

MAC addresses of each commissioned and accepted device are recorded in a database of accepted devices. This address is used in the header of each transaction. This provides a second level of data validation. As devices are removed, so too are their IDs from the accepted database and place in a database of failed units or potential "outlaws". Those units must undergo a wipe, recommissioning and reseeding with the key prior to being accepted into the network once again.

Certain interactions can be excluded from the key checking requirement. For instance, users can be allowed to alter light levels in their specific areas. Such changes may be validated by validating their Service Set Identifier (SSID).

Figure 10:
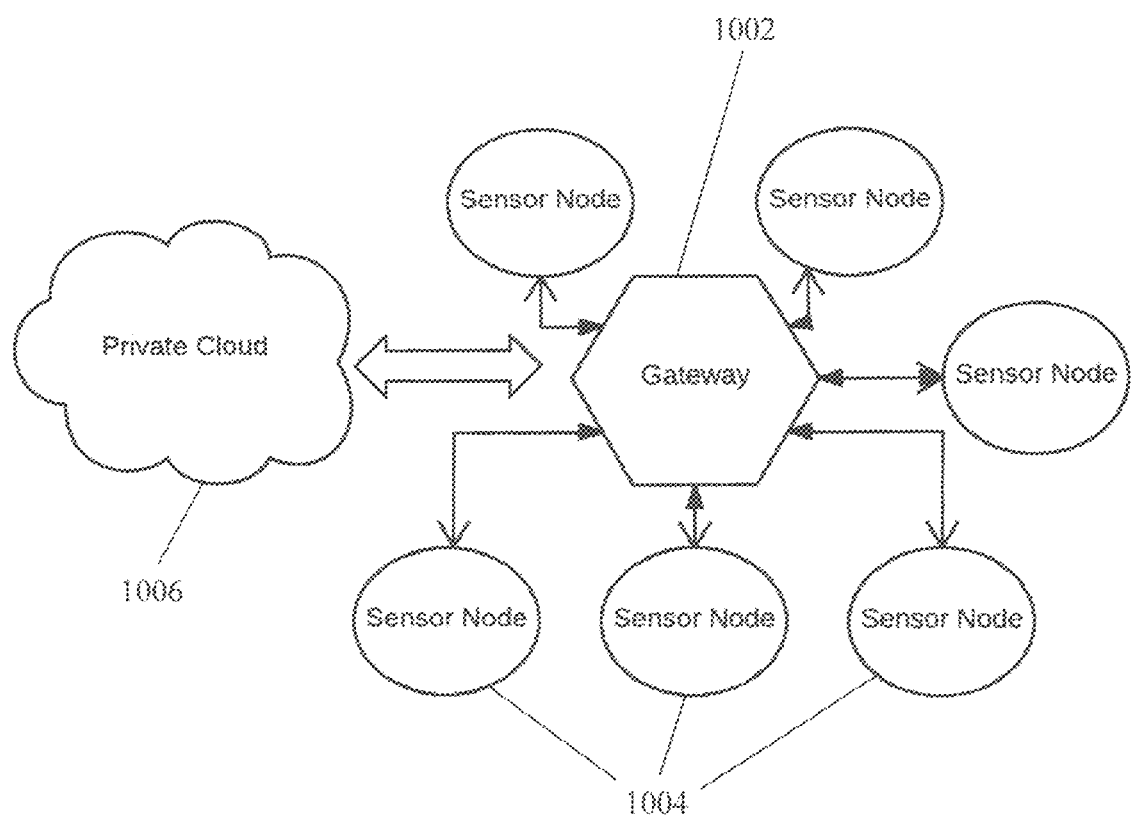
FIG. 10 is a block diagram illustrating the communication gateway that interfaces with the various control system sensors.

Reference to FIGS. 10 through 13 illustrate the principles of operation under the communication and control security aspect of the invention. FIG. 10 illustrates some of the sensory data that is derived from each sensor array 1004. Every exchange is reauthorized by the blockchain stored in the ASIC security area and time stamped. All sensor input and output transactions pass through a security gateway 1002 which interacts with a private cloud 1006 in which the blockchain ledger is stored and updated.

Figure 11:
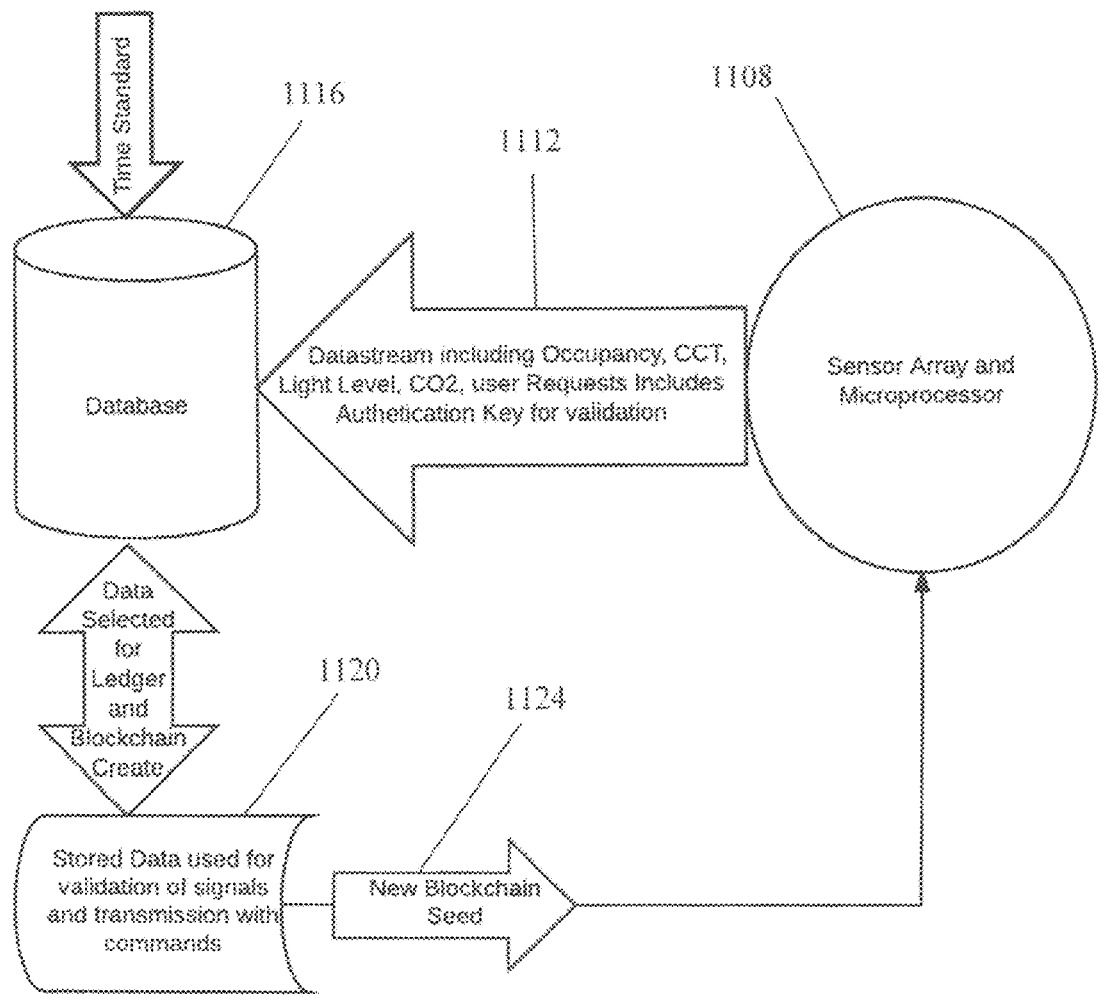
FIG. 11 is a process flow diagram of the system security blockchain process.

FIG. 11 illustrates the cloud processing for maintenance of the blockchain ledger data and creation of the current transaction ledger for updating system security. An encrypted packet which contains an identifier of the device transmitting it, the existing ledger and each time-stamped event or measurement is transmitted to the cloud or local server where it is authenticated, processed and added to the database 1116. These transactions and those of other sensor arrays are selected for inclusion in a new ledger 1120. That ledger is transmitted to the connected devices on the network in an encrypted packet that includes the existing ledger for authentication.

The sensor array and microprocessor 1108 on the ASIC produces a datastream 1112 of building control system sensor data, which includes an authentication key for validation of transactions. The data is stored in a database 1116, time stamped, and the latest stored data is selected 1120 for validation of signals and transmission with system commands. A new blockchain seed 1124 is created from this data and passed back to the microprocessor 1108 for validation of secure system processes.

Figure 12:
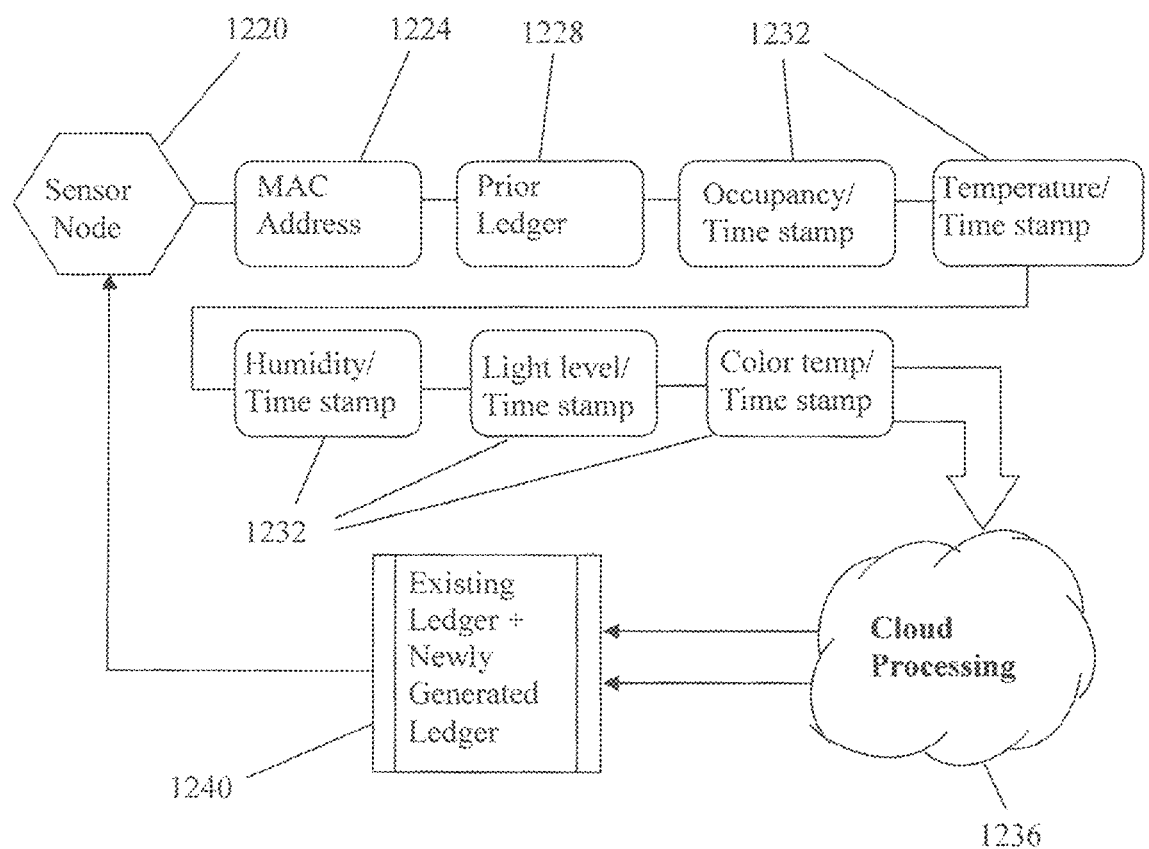
FIG. 12 is a block diagram illustrating the generation of the security ledger from the existing ledger and sensor data.

FIG. 12 illustrates the same process at a higher level, wherein the data processing in FIG. 11 is performed in the cloud 1236. The sensor information from the sensors 1232 together with prior ledger data 1228 and MAC address 1224 are passed to the cloud processing process 1236. On a regular basis all, part or randomly selected transactions are encoded into a ledger that is transmitted in the blockchain. Receipt of that ledger is predicated on an exchange of the prior ledger. The new ledger 1240 becomes the key for all transactions.

Figure 13:
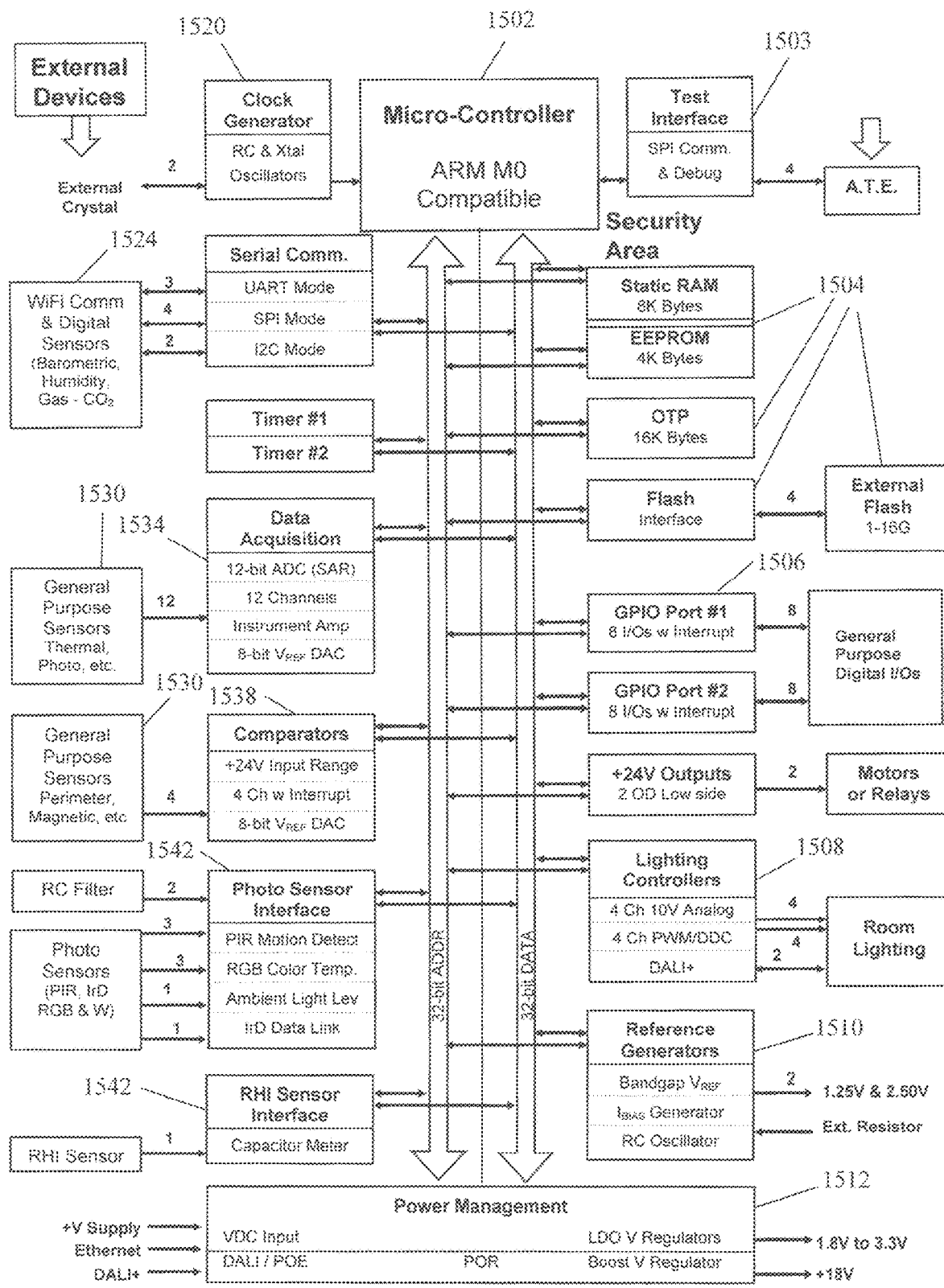
FIG. 13 is a block diagram of the building control system ASIC security area.

Finally, FIG. 13 illustrates the ASIC device functionality in block diagram form, including the system security aspect of the invention implemented in the ASIC. Central to the ASIC is the Micro-controller 1502. There are interfaces for test equipment 1503 and clock signals 1520. The security area on the device comprises memory elements 1504 that support the blockchain ledger database in large capacity external flash. An EEPROM contains a security algorithm for computing the authentication string while static RAM memory holds the most recent working security data.

The remaining ASIC functionality illustrated in FIG. 13 is that already described above. There are general purpose I/O ports 1506. Multiple sensor interfaces 1524, 1530, 1542 provide external sensor inputs to the building control device. Certain sensors communicate discrete measurements that pass through analog to digital conversion 1534 while others are state signals that pass through comparators that provide stable signals to the micro-controller. There are power management circuits 1512 to regulate several power levels on the device.

The invention may be expressed and implemented in ways that do not duplicate the specific description contained here without deviating from the basic functions and effects of the invention. Accordingly, reference must be made to the following claims to determine the scope of the invention.

I claim:

1. An operations management system comprising an integrated sensor network and control system, said control system comprising a local security area further comprising a self-contained communication and control security system, including storage devices, intelligence, and a processor, that maintain a ledger of all transactions stored in the local security area and that requires validation of said ledger before accepting data or commands from any device in the control system, and which a count of all transactions is a seed establishment of a security key.

2. The operations management system of claim 1, wherein the count of all transactions is combined with the ledger of all transactions to establish the security key.

3. The operations management system of claim 2, wherein each time a new security key is reseeded into system transactions replacing a prior key, the new security key is preceded with the prior key for validation.

4. The operations management system of claim 1, wherein the self-contained communication and control security system prevents hostile intrusion into both sensor and control transactions to and from the operations management system ensuring that control transactions are based on actual sensor data and that control transactions for managed operations are valid.

5. The operations management system of claim 1, wherein a current blockchain is communicated to a remote device in a network of devices in the operations management system, said remote device is commissioned by seeding said remote device with a current blockchain, a media access control (MAC) address of said remote device is recorded into an active device library maintained by the self-contained communication and control security system prior to the remote device's admission into the device network of the operations management system after the MAC address is validated.

6. The operations management system of claim 1, wherein a remote device in a network of devices in the operations management system is commissioned by seeding said remote device with a current cyclic redundancy check (CRC), a media access control(MAC) address of said remote device is recorded into active device library maintained by the self-contained communication and control security system prior to the remote device's admission into the device network of the operations management system after the MAC address is validated.

7. The operations management system of claim 1, wherein said operations management system is private cloud connected.

8. A private cloud connected operations management system, said operations management system comprising networked sensors and controlled devices that maintain a ledger of all transactions within each controlled device and require validation of that ledger before accepting data or commands from any device, and in which a count of all transactions is used as a key in combination with the ledger of transactions.

9. The system of claim 8 wherein each time a new security key is reseeded into system transactions replacing a prior key, the new security key is preceded with the prior key for validation.

10. An operations management system comprising an integrated sensor network and control system, said control system comprising a local security area further comprising a self-contained communication and control security system, including storage devices, intelligence, and a processor, that maintain a ledger of selected transactions stored in the local security area and that requires validation of said ledger before accepting data or commands from any device in the control system, and in which a count of said transactions is a seed for establishment of a security key.

11. The operations management system of claim 10, wherein the count of said selected transactions is combined with the ledger of transactions to establish the security key.

12. The operations management system of claim 11, wherein each time a new security key is reseeded into system transactions replacing a prior key, the new security key is preceded with the prior key for validation.

13. The operations management system of claim 10, wherein the self-contained communication and control security system prevents hostile intrusion into both sensor and control transactions to and from the operations management system ensuring that control transactions are based on actual sensor data and that control transactions for the managed operations are valid.

14. The operations management system of claim 10, wherein said operations management system is private cloud connected.

15. The operations management system of claim 10, wherein a current blockchain is communicated to a remote device in a network of devices in the operations management system, said remote device is commissioned by seeding said remote device with a current blockchain, a unique device identifier of said remote device is recorded into an active device library maintained by the self-contained communication and control security system prior to the remote device's admission into the device network of the operations management system after the unique device identifier is validated.

16. The operations management system of claim 10, wherein a remote device in a network of devices in the operations management system is commissioned by seeding said remote device with a current cyclic redundancy check (CRC), a unique device identifier of said remote device is recorded into an active device library maintained by the self-contained communication and control security system prior to the remote device's admission into the device network of the operations management system after the unique device identifier is validated.

* * * * *